(12) United States Patent
Kuroki (10) Patent No.: US 8,186,894 B2
(45) Date of Patent: May 29, 2012

(54) LENS BARRIER UNIT

(75) Inventor: Hiroyuki Kuroki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/939,456

(22) Filed: Nov. 4, 2010

(65) Prior Publication Data

US 2011/0176798 A1    Jul. 21, 2011

(30) Foreign Application Priority Data

Nov. 5, 2009    (JP) .................................. 2009-253711
Nov. 1, 2010    (JP) .................................. 2010-245043

(51) Int. Cl.
*G03B 17/00* (2006.01)
*G02B 23/16* (2006.01)

(52) U.S. Cl. ........................................ 396/448; 359/511
(58) Field of Classification Search .................. 396/448; 359/511

See application file for complete search history.

(56) References Cited

U.S. PATENT DOCUMENTS

| | | | |
|---|---|---|---|
| 5,913,089 A * | 6/1999 | Ebe | 396/448 |
| 2004/0081448 A1 * | 4/2004 | Suzuki | 396/448 |
| 2006/0081343 A1 * | 4/2006 | Clark et al. | 160/218 |
| 2010/0158503 A1 * | 6/2010 | Fujiwara | 396/448 |

FOREIGN PATENT DOCUMENTS

| | | | |
|---|---|---|---|
| JP | 05-216092 | * | 8/1993 |
| JP | 2002-258133 | | 9/2002 |

\* cited by examiner

*Primary Examiner* — Rodney Fuller
(74) *Attorney, Agent, or Firm* — Hamre, Schumann, Mueller & Larson, P.C.

(57) ABSTRACT

A lens barrier unit that can further reduce the retraction space of lens barriers is provided. The lens barrier unit includes a barrier case having an opening; and multiple spherical barriers provided so as to pivot about a pivotal axis. The barriers can be shifted between a first state for closing the opening and a second state for opening the opening. In the second state, the barriers are all stored in the lower part of the barrier case.

6 Claims, 12 Drawing Sheets

LENS BARRIER UNIT

FIELD OF THE INVENTION

The present invention relates to a lens barrier unit.

BACKGROUND OF THE INVENTION

In widely known configurations for protecting imaging lenses, barriers are provided in front of the lenses, for example, on the ends of lens-barrels such that the barriers can be opened and closed. A lens barrier unit (barrier open/close support device) including such barriers is typically configured as follows: a flat plate as a barrier is divided into an upper half serving as an upper barrier and a lower half serving as a lower barrier. These barriers are supported by a barrier support mechanism including a support arm such that the barriers can extend and retract in the vertical direction. Instead of upper and lower barriers, a barrier may be divided into right and left barriers or in a substantially diagonal direction, or three or more barriers may be provided.

In such a lens barrier unit of the related art, a lens to be protected by the barriers typically has a spherical surface but the barriers are flat. Thus a distance between the barrier and the lens increases on the outer periphery of the lens surface and results in a large space. Consequently, a lens-barrel including the lens barrier unit increases in capacity, which has been an obstacle to size reduction.

Further, in the lens barrier unit of the related art, the flat barriers require retraction spaces directly above and below an opening that is opened and closed by the barriers. The spaces directly above and below the opening cannot be effectively used for other functional components or cannot be eliminated for size reduction.

Figure 16:
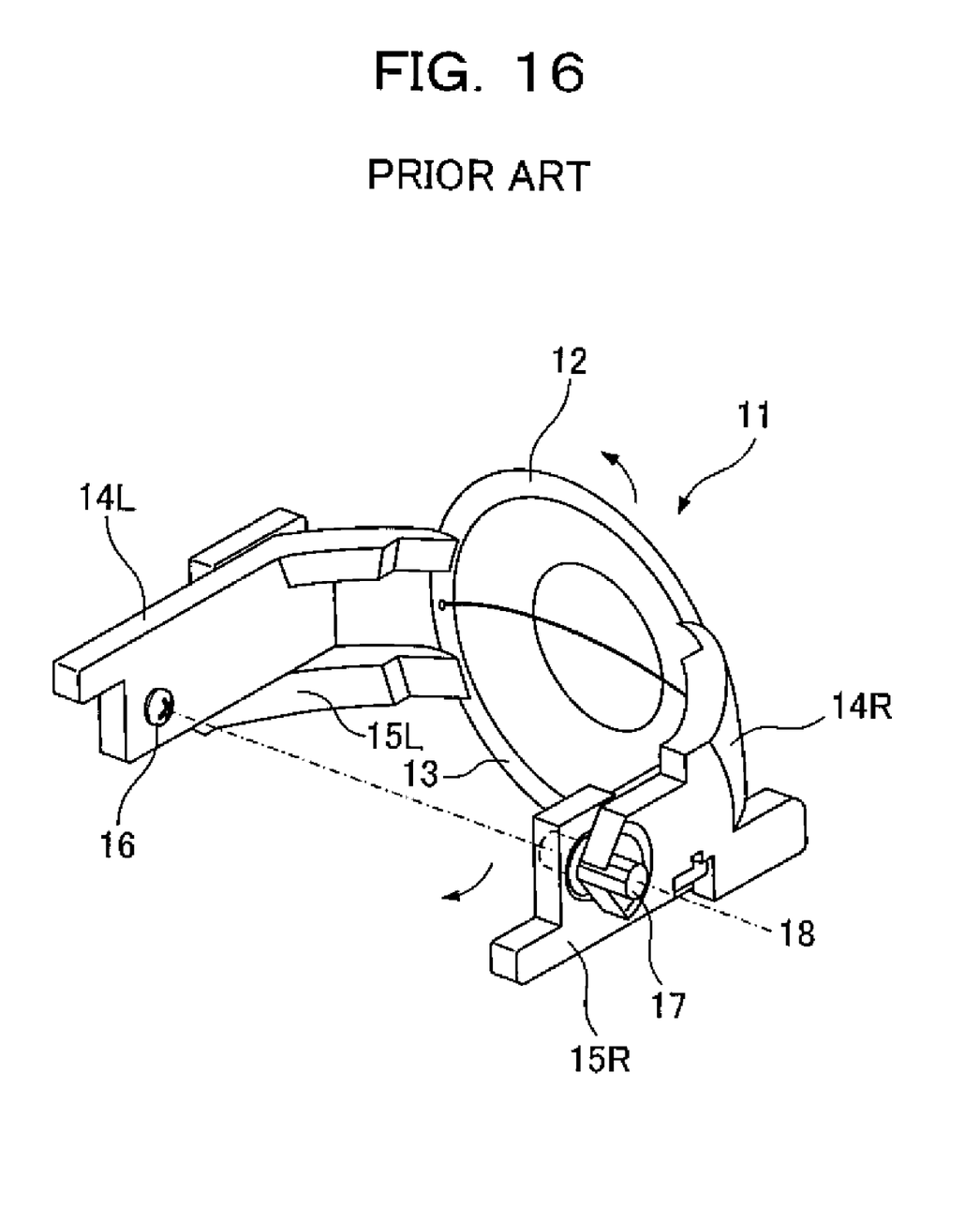
FIG. 16 is a perspective view schematically showing the barriers of a lens-barrel and the support open/close mechanism of the barriers according to the related art.

In order to address this problem, Japanese Patent Laid-Open No. 2002-258133 (hereinafter, will be called patent document 1) discloses a lens-barrel having spherical barriers along the surface of a lens instead of flat barriers. As shown in FIG. 16, a barrier 11 of the lens-barrel has a spherical surface (called a partially spherical shell in patent document 1) centered around a point on the axis of the lens-barrel (the optical axis of the lens). The barrier 11 is divided into an upper half barrier 12 and a lower half barrier 13. The upper half barrier 12 and the lower half barrier 13 are supported by two pairs of arms 14L, 14R, 15L, and 15R that extend from both sides to the rears of the barriers. Further, the upper half barrier 12 and the lower half barrier 13 can pivot about a pivotal axis 18 passing through two pivot shafts 16 and 17 provided at the rear ends of the arms 14L, 14R, 15L, and 15R. The pivotal axis 18 is orthogonal to the axis of the lens-barrel (the optical axis of the lens). Thus the upper half barrier 12 and the lower half barrier 13 can vertically open and close in a movement path that is substantially shaped like a cylinder centered around the pivotal axis 18 and has a radius between the pivotal axis 18 and the upper half barrier 12 (or the lower half barrier 13).

In the case of the spherical barrier 11, a distance between the barrier 11 and the lens does not vary between the outer periphery and the center of the lens, thereby reducing a distance between the outer periphery of the lens surface and the barrier 11. Thus the lens-barrel including the lens barrier unit can be reduced in capacity, achieving size reduction to some extent. Moreover, the retracted upper half barrier 12 and lower half barrier 13 are located in the rear as compared to the upper half barrier 12 and lower half barrier 13 in a closed state. With this configuration, an area directly above the closed upper half barrier 12 and an area directly below the closed lower half barrier 13 can be effectively used for other functional components, or these areas can be eliminated from the lens barrier unit and the lens-barrel.

DISCLOSURE OF THE INVENTION

In the lens-barrel disclosed in patent document 1, however, the opened barrier 11 (12, 13) is retracted upward and downward. Therefore, the barrier 11 (12, 13) requires retraction spaces above and below the lens-barrel.

In the lens-barrel disclosed in patent document 1, the upper half barrier 12 and the lower half barrier 13 pivot about the horizontal pivotal axis 18 that is orthogonal to the optical axis and is located at a point on the axis of the lens-barrel and behind the closed barrier 11 (11, 12) and the lens. Therefore, as a passage space for the opening/closing upper half barrier 12 and the lower half barrier 13 and a storage space (movement path) for retraction, spaces with additional dimensions are necessary at the front and rear of the barrier 11 in addition to the thickness of the barrier 11. Moreover, pivot spaces are required for the two pairs of arms 14L, 14R, 15L, and 15R that support the upper half barrier 12 and the lower half barrier 13.

The present invention has been devised to solve the problems. An object of the present invention is to provide a lens barrier unit which can further reduce the retraction space and the movement path space of barriers.

In order to solve the problems, a lens barrier unit of the present invention includes: a barrier case having an opening; and multiple spherical barriers provided so as to pivot about a pivotal axis, wherein the barriers are movable between a first state for closing the opening and a second state for opening the opening, the barriers in the second state are all stored so as to be displaced from the opening of the barrier case in one direction, for example, in a downward direction, and the barriers in the second state are stored so as to be at least partially located rearward of the barriers in the first state.

With this configuration, the barriers are all stored so as to be displaced from the opening of the barrier case in one direction, for example, in the lower part of the barrier case. Consequently, the retraction space of the lens barriers can be reduced as compared with the case where barriers are stored so as to be displaced from the opening of the barrier case in two directions, for example, in the upper part and the lower part of the barrier case. Further, the barriers in the second state are stored so as to be at least partially located rearward of the barriers in the first state. Thus spaces directly above and below the opening can be effectively used for other functional components or these spaces can be eliminated for size reduction.

Moreover, the pivotal axis is provided along a line from the surface to the center of a sphere that forms the spherical shape of the barrier.

In this configuration, the spherical barrier moves along the surface of the sphere that forms the spherical shape of the barrier. Thus it is possible to considerably reduce the retraction space and movement path space of the barriers. Further, pivot shafts may be provided directly on the barriers or may be provided on the barrier case so as to penetrate the barriers. Thus it is not necessary to provide an arm for pivoting the barriers, eliminating a space for moving the arm. This configuration can minimize a space for the lens barrier unit.

Moreover, the barriers of the lens barrier unit of the present invention are stored in the lower part of the barrier case in the second state. Thus a space above the opening and spaces on the right and left of the opening can be effectively used for other functional components or these spaces can be eliminated for size reduction.

Further, in the first state with the closed opening, the barriers form an exposed portion in the opening such that the exposed portion is centered on the optical axis of a lens to be protected by the barriers, and the barriers are substantially shaped along the front face of the lens.

In this configuration, the barriers and the lens can be located close to each other such that a distance between the barriers and the lens does not vary between the outer periphery and the center of the lens. Thus in the first state with the closed opening, it is possible to minimize a space between the barriers and the lens, achieving a space-saving design.

The present invention can provide a lens barrier unit that can further reduce the retraction space and the movement path space of lens barriers.

DESCRIPTION OF THE EMBODIMENT

Referring to the accompanying drawings, the following will describe an example in which the present invention is applied to a lens barrier unit used for a digital video camera.
[1. Overall Configuration]

Figure 1:
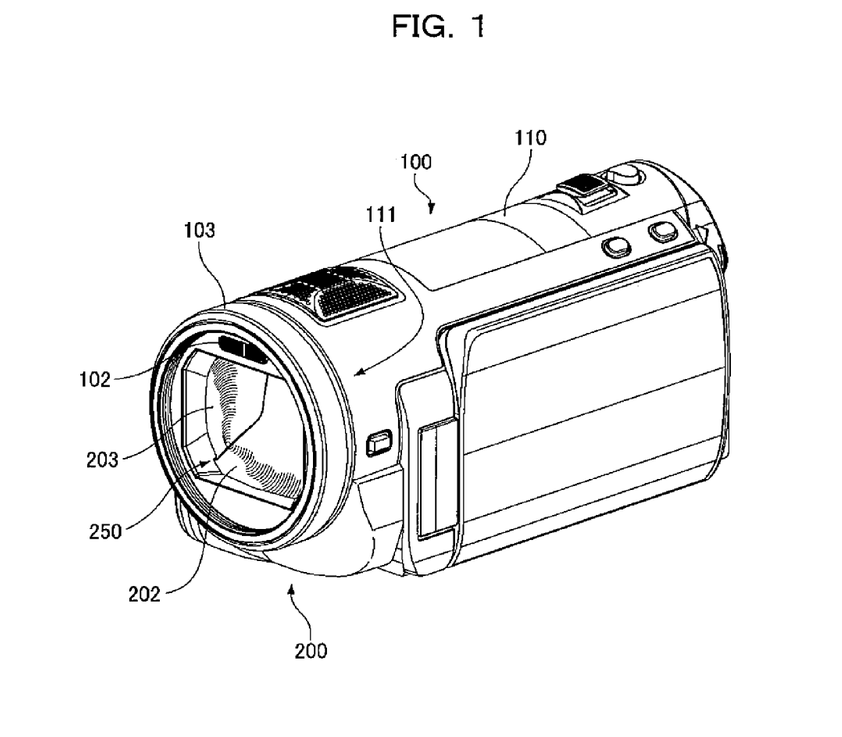
FIG. 1 is an overall perspective view of a digital video camera including a lens barrier unit according to an embodiment of the present invention.
Figure 14:
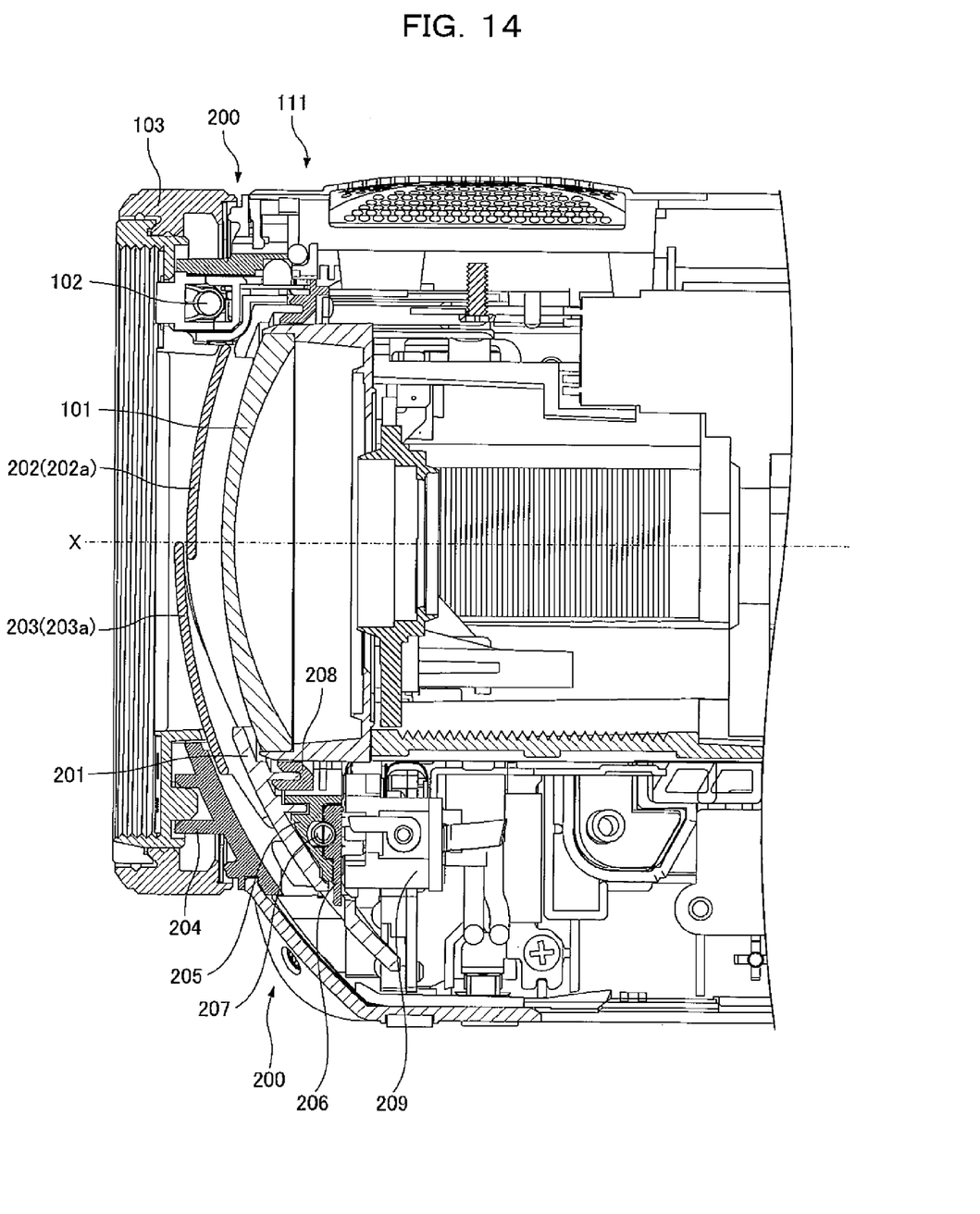
FIG. 14 shows a longitudinal section of the closed lens barrier unit along a vertical plane passing through the optical axis of the lens of the digital video camera.
Figure 15:
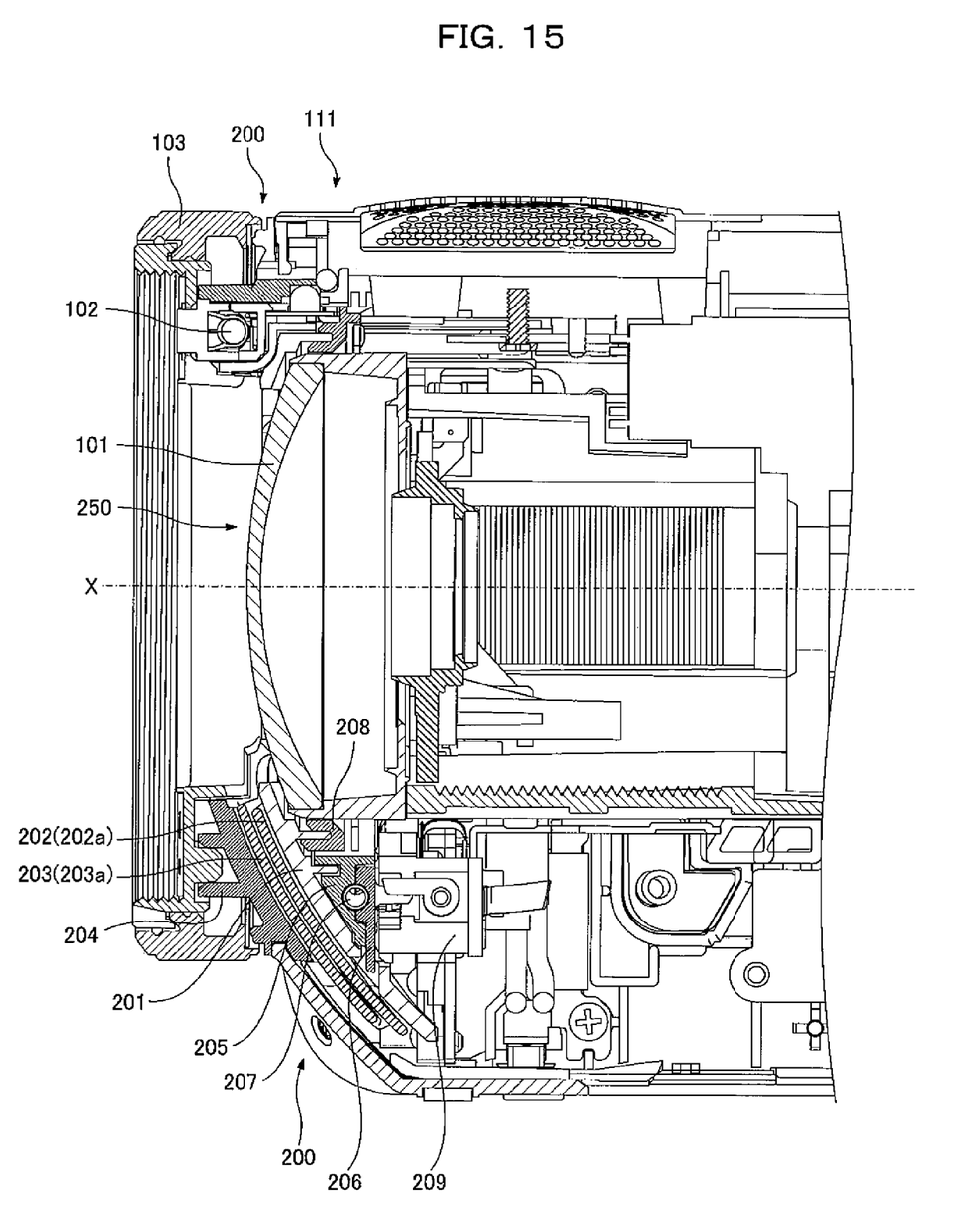
FIG. 15 shows a longitudinal section of the opened lens barrier unit along the vertical plane passing through the optical axis of the lens of the digital video camera.

Referring to FIG. 1 and other drawings, the following will describe the overall configuration of a digital video camera 100 according to an embodiment of the present invention. FIG. 1 is an overall perspective view of the digital video camera 100 including a lens barrier unit according to the embodiment of the present invention. FIGS. 14 and 15 are sectional views of the lens barrier unit. As shown in FIGS. 1, 14, and 15, the digital video camera 100 has a lens 101 in a lens-barrel 111 of a unit body 110. In order to prevent damage and contamination on the lens 101 except during shooting, the digital video camera 100 includes a lens barrier unit 200 that can be opened and closed in front of the lens 101. At a time of shooting, the lens barrier unit 200 enters an opened state (a second state, see FIG. 15) to open an opening 250. Except during shooting, the lens barrier unit 200 enters a closed state (a first state, see FIGS. 1 and 14) to close the opening 250.
[2. Configuration of the Lens Barrier Unit]

Figure 2:
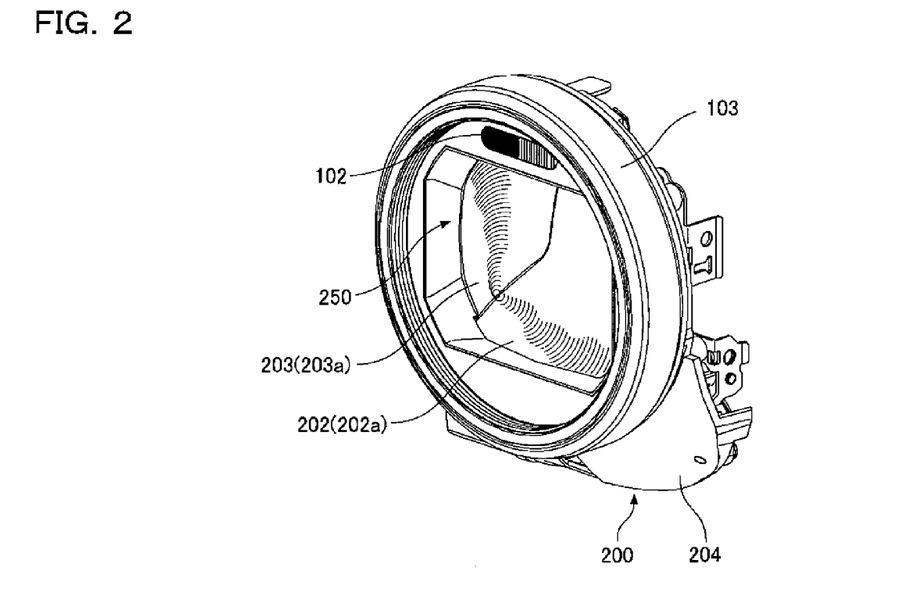
FIG. 2 is a perspective view showing the lens barrier unit.
Figure 3:
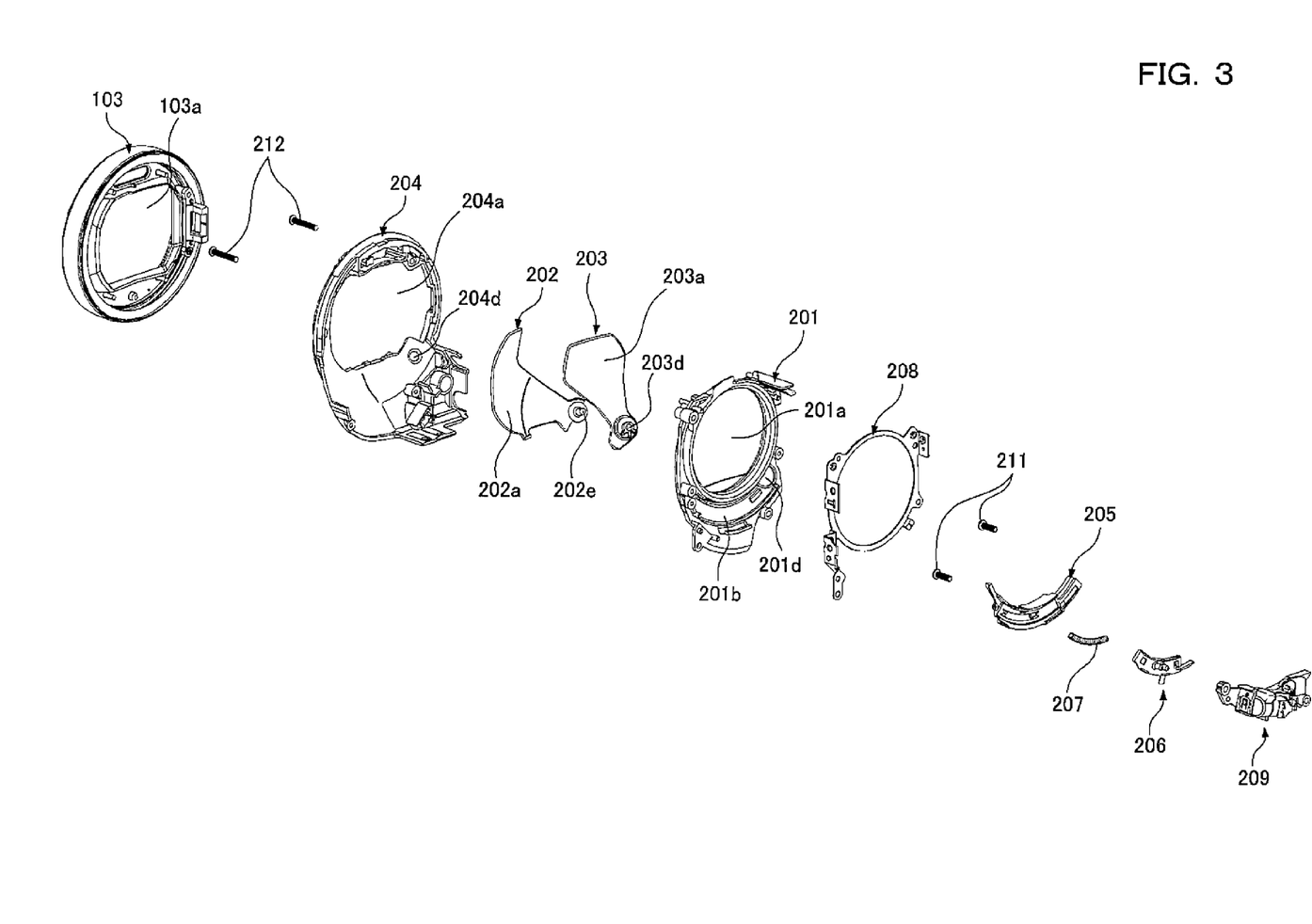
FIG. 3 is an exploded perspective view showing the lens barrier unit diagonally from the rear.
Figure 4:
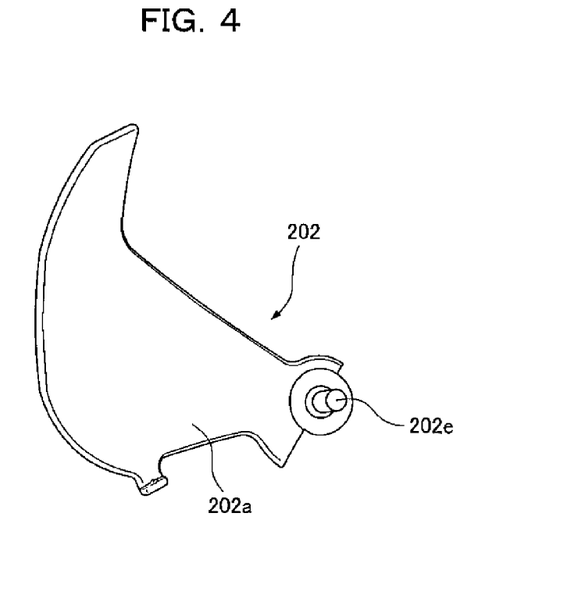
FIG. 4 is a perspective view showing the principle part of the front barrier of the lens barrier unit diagonally from the rear.
Figure 5:
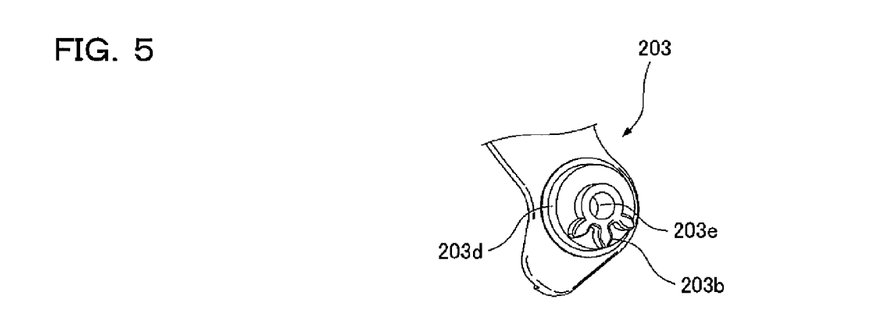
FIG. 5 is a perspective view partially showing the principle part of the rear barrier of the lens barrier unit diagonally from the rear.
Figure 6:
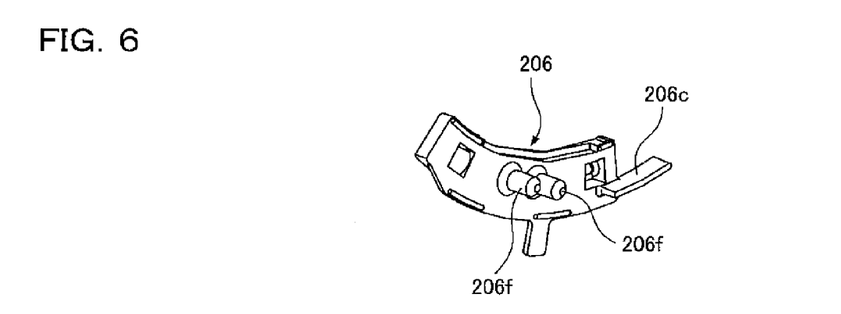
FIG. 6 is a perspective view showing the barrier piece of the lens barrier unit diagonally from the rear.
Figure 7:
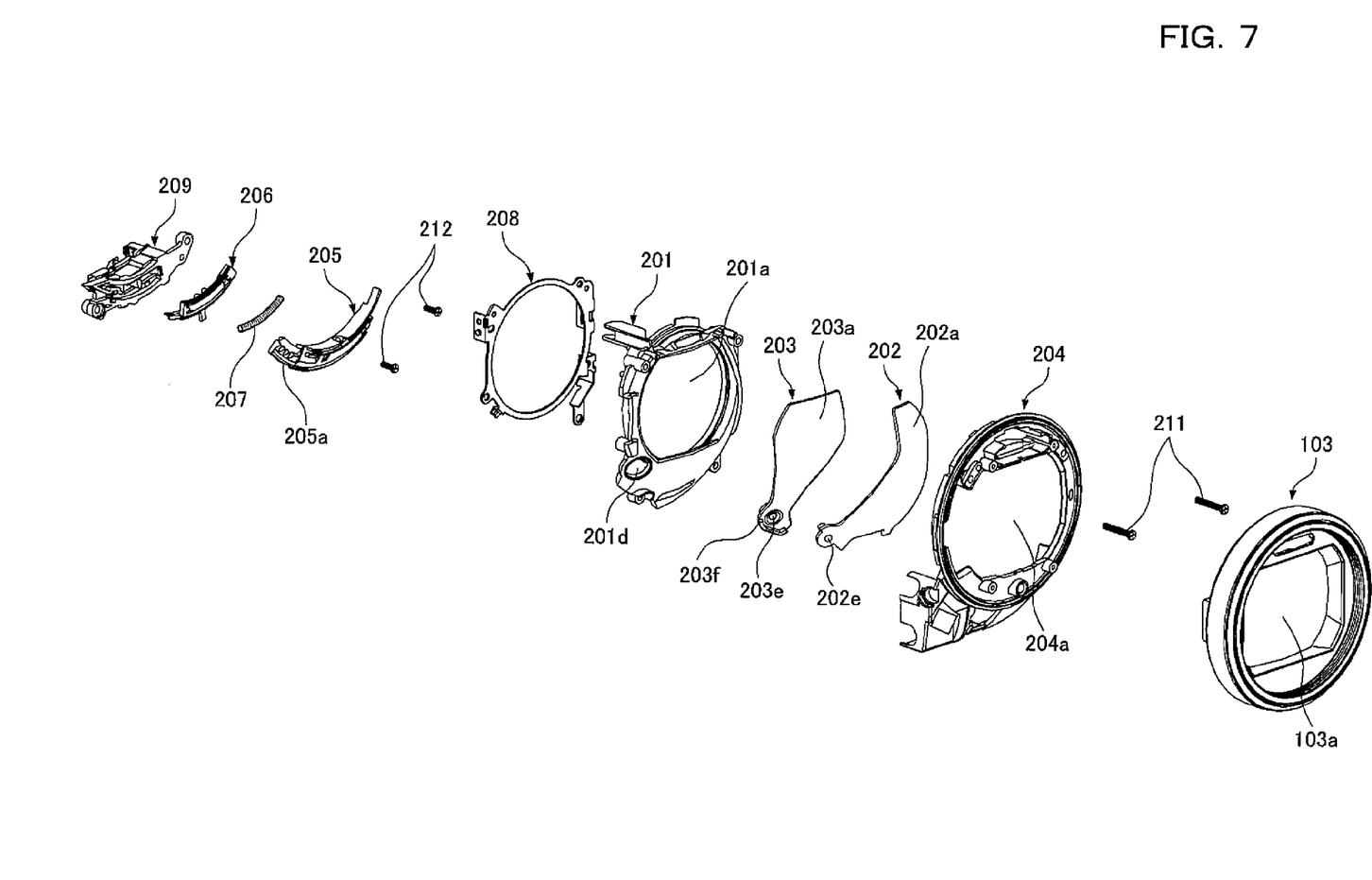
FIG. 7 is an exploded perspective view showing the lens barrier unit diagonally from the front.
Figure 8:
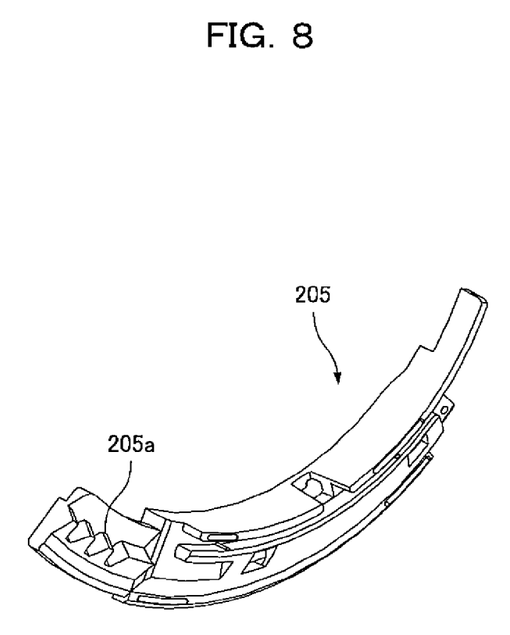
FIG. 8 is a perspective view showing the barrier lever of the lens barrier unit diagonally from the front.
Figure 9:
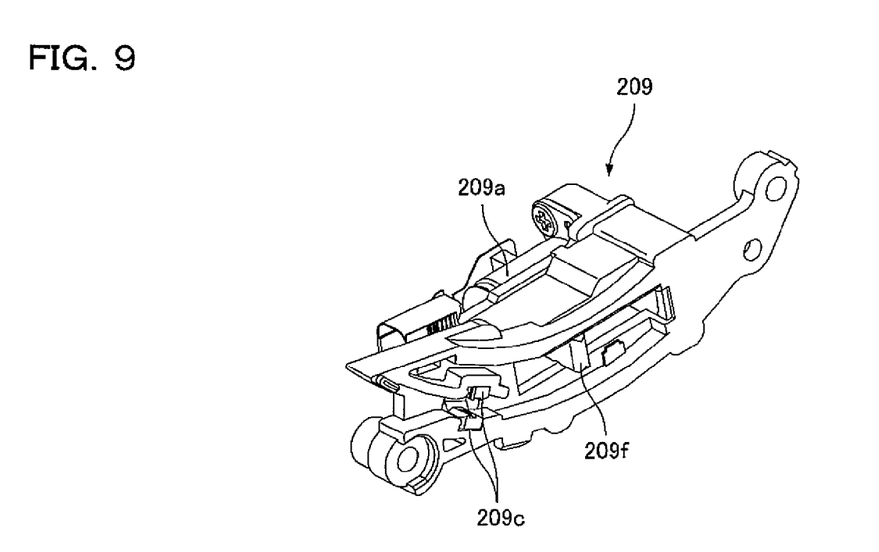
FIG. 9 is a perspective view showing the barrier motor unit of the lens barrier unit diagonally from the front.
Figure 13:
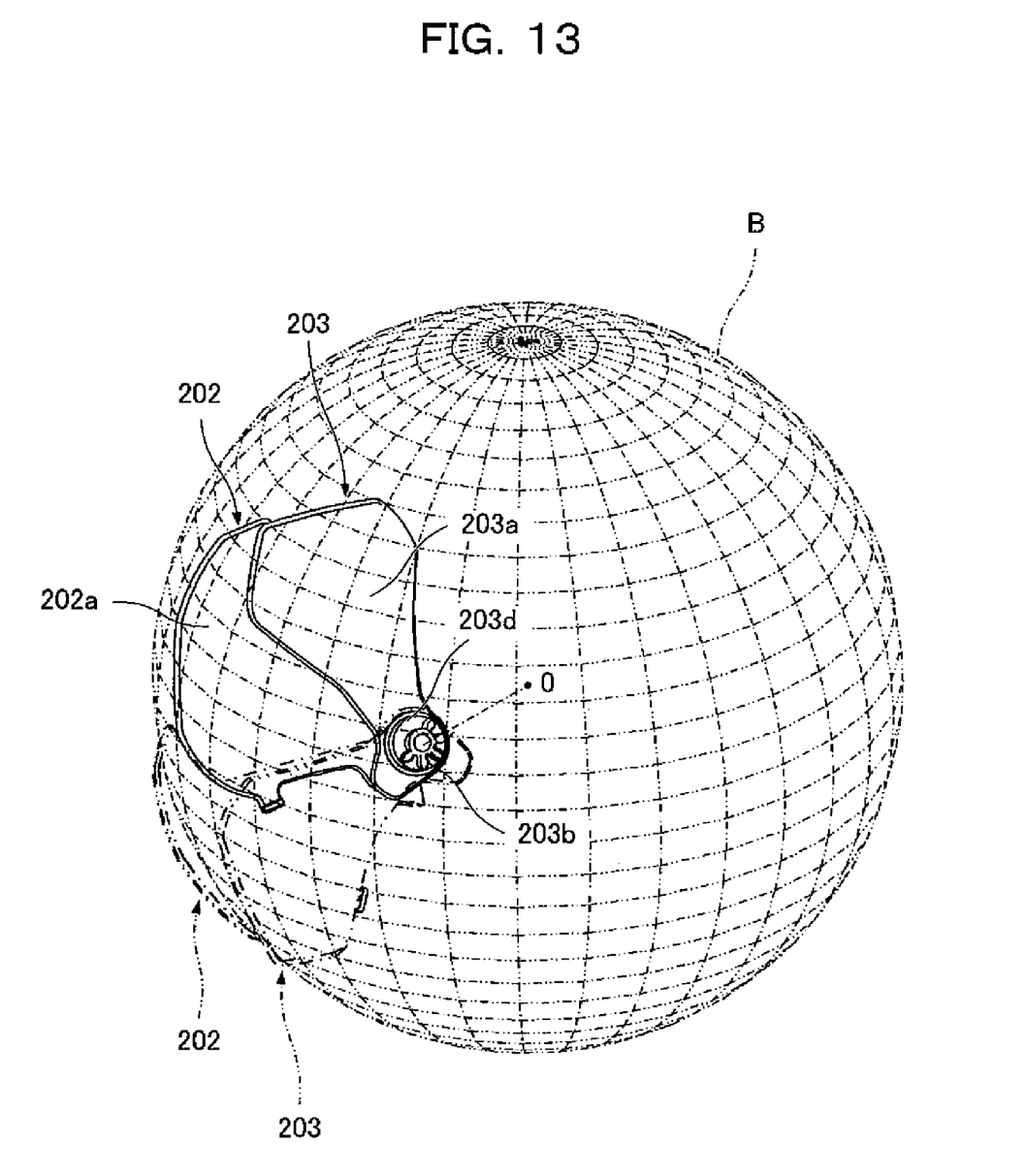
FIG. 13 conceptually shows the positional relationship between the front and rear barriers and a pivotal axis in the lens barrier unit.

Referring to FIGS. 2 to 9 and 13 to 15, the configuration of the lens barrier unit 200 will be described below. FIG. 2 is a perspective view showing the lens barrier unit 200. FIG. 3 is an exploded perspective view showing the lens barrier unit 200 diagonally from the rear. FIG. 4 is a perspective view showing the principle part of the front barrier of the lens barrier unit diagonally from the rear. FIG. 5 is a perspective view partially showing the principle part of the rear barrier of the lens barrier unit diagonally from the rear. FIG. 6 is a perspective view showing the barrier piece of the lens barrier unit diagonally from the rear. FIG. 7 is an exploded perspective view showing the lens barrier unit diagonally from the front. FIG. 8 is a perspective view showing the barrier lever of the lens barrier unit diagonally from the front. FIG. 9 is a perspective view showing the barrier motor unit of the lens barrier unit diagonally from the front. FIG. 13 conceptually shows the positional relationship between the front and rear barriers and a pivotal axis in the lens barrier unit. FIG. 14 shows a longitudinal section of the closed lens barrier unit along a vertical plane passing through the optical axis of the lens of the digital video camera. FIG. 15 shows a longitudinal section of the opened lens barrier unit along the vertical plane passing through the optical axis of the lens of the digital video camera.

FIG. 2 shows the appearance of the overall configuration of the lens barrier unit 200. The lens barrier unit 200 is made up of multiple constituent elements shown in FIGS. 3 and 7. The constituent elements of the lens barrier unit 200 will be specifically described below. In the following explanation, "front" means the left sides of FIGS. 14 and 15 and "rear" means the right sides of FIGS. 14 and 15. Further, "left side" and "right side" in the following explanation mean "left side" and "right side" of FIG. 3 in which the lens barrier unit is viewed from the rear to the front.

As shown in FIGS. 3 and 7 (FIGS. 2 to 15), the lens barrier unit 200 includes a front barrier 202, a rear barrier 203, a front barrier case 204 and a rear barrier case 201 that hold the front barrier 202 and the rear barrier 203, a front angle 208, a barrier motor unit 209, a barrier piece 206, and a barrier lever 205. The front barrier 202 and the rear barrier 203 are formed by dividing a spherical barrier for protecting the lens 101 (see FIGS. 14 and 15). When the lens barrier unit 200 is closed, the barriers are partially overlapped each other in the longitudinal direction of the lens barrier unit 200. The front barrier case 204 and the rear barrier case 201 pivotally sandwich and hold the front barrier 202 and the rear barrier 203 from the front and the rear. The front angle 208 assembles these constituent elements (the front barrier 202, the rear barrier 203, the front barrier case 204, and the rear barrier case 201) to a manual focus ring unit 103 provided at the front of the digital video camera 100. The barrier motor unit 209 has a motor 209a (see FIG. 9) acting as a driving source for pivotally opening and closing the front barrier 202 and the rear barrier 203. The barrier piece 206 and the barrier lever 205 transmit a driving force from the motor 209a to the rear barrier 203 to pivot the rear barrier 203.

The front barrier 202 and the rear barrier 203 are both spherically formed and project to the front (specifically, like a part of the outline of a sphere) in a closed state (first state). Moreover, as shown in FIGS. 3 to 5, the front barrier 202 and the rear barrier 203 respectively include pivot shafts 202e and 203d, which extend diagonally to the rear, at the lower right ends of the barriers in a closed state. As shown in FIGS. 3 and 7, openings 103a, 204a, and 201a for transmitting light to the lens 101 are formed on the manual focus ring unit 103, the front barrier case 204, and the rear barrier case 201, respectively. The openings 103a, 204a, and 201a constitute the opening 250 (see FIGS. 11 and 15) of the lens barrier unit 200. Reference numeral 102 in FIG. 1 and other drawings denotes a strobe light emitting unit provided in the upper part of the lens barrel of the digital video camera 100.

As shown in FIG. 3, the rear face of the front barrier case 204 is spherical around the opening 204a and on the lower part of the opening 204a. As shown in FIG. 7, the front face of the rear barrier case 201 is also spherical around the opening 201a and on the lower part of the opening 201a. As shown in FIGS. 3, 7, 10, 11, and other drawings, the rear face of the front barrier case 204 and the front face of the rear barrier case 201 hold the front barrier 202 and the rear barrier 203 from the front and the rear such that the front barrier 202 and the rear barrier 203 can pivot about the pivot shafts 202e and 203d (see FIGS. 4 and 5) by a predetermined angle. To be specific, a portion projecting diagonally to the rear from the pivot shaft 202e of the front barrier 202 is inserted into an insertion hole 203e formed in the pivot shaft 203d of the rear barrier 203. As shown in FIGS. 3 and 7, the rear barrier case 201 includes a pivot shaft hole 201d to which the pivot shaft 203d of the rear barrier 203 is inserted. As shown in FIG. 3, the front barrier case 204 includes a recessed portion 204d into which a front projecting portion 202e' (see FIG. 12) is fit. The front projecting portion 202e' projects from the pivot shaft 202e of the front barrier 202 to the front. Further, the pivot shaft 203d of the rear barrier 203 is inserted into the pivot shaft hole 201d of the rear barrier case 201, and the front projecting portion 202e' of the pivot shaft 202e of the front barrier 202 is fit into the recessed portion 204d of the front barrier case 204. In this state, the front barrier 202 and the rear barrier 203 are pivotally held.

Figure 12:
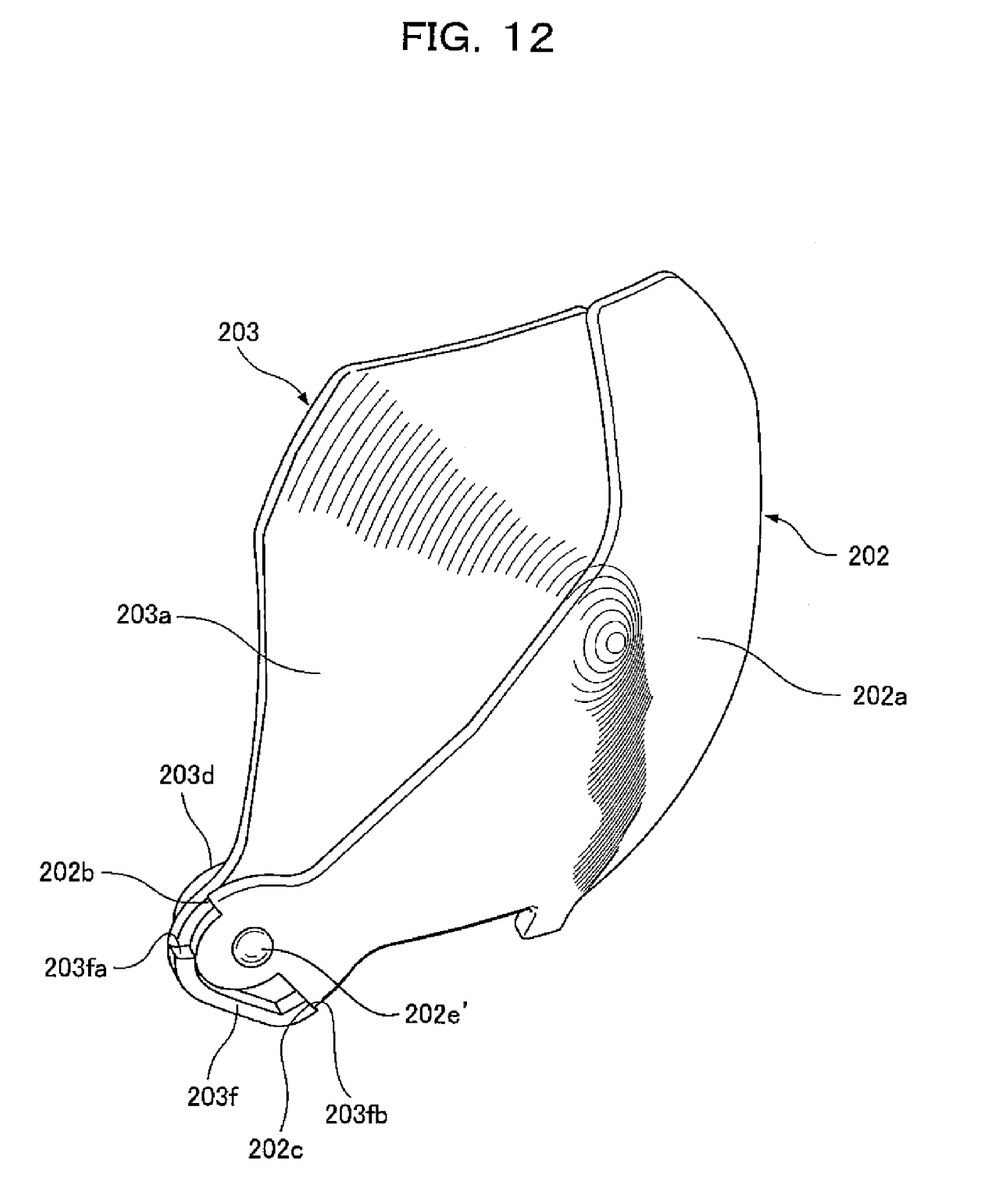
FIG. 12 is a perspective view in which the front barrier is pivoted by the rear barrier.

As shown in FIG. 12, on one end (the lower end in FIG. 12) of the front face of the rear barrier 203, a driving convex portion 203f is formed that laterally extends while projecting to the front. On the front barrier 202, two driven engaging portions 202b and 202c are formed that can be engaged with ends 203fa and 203fb of the driving convex portion 203f of the rear barrier 203. When the pivoting of the rear barrier 203 is larger than a predetermined angle with respect to the front barrier 202, the end 203fa or the end 203fb of the driving convex portion 203f of the rear barrier 203 comes into contact with the driven engaging portion 202b or the driven engaging portion 202c of the front barrier 202. Thus the front barrier 202 moves along with the pivoting of the rear barrier 203.

As conceptually shown in FIG. 13, the pivotal axis of the pivot shaft 202e of the front barrier 202 and the pivotal axis of the pivot shaft 203d of the rear barrier 203 are aligned with each other. Further, the extensions of the pivotal axes pass through center 0 of a sphere B formed along a spherical part 203a of the rear barrier 203 (the center 0 also serves as the center of a sphere B' (not shown) formed along a spherical part 202a of the front barrier 202). The rear barrier 203 and the front barrier 202 are provided such that the barriers are respectively opened and closed along the outer surfaces of the spheres B and B' formed by the spherical parts 203a and 202a of the rear barrier 203 and the front barrier 202. The sphere B' formed along the spherical part 202a of the front barrier 202 shares the center 0 with the sphere B and is increased in radius substantially by the thickness of the spherical part 203a of the rear barrier 203.

When the front barrier 202 and the rear barrier 203 are in a closed state (first state) with the closed opening 250 (see FIG. 15), the spherical part 202a of the front barrier 202 and the spherical part 203a of the rear barrier 203 form a spherical part whose center is located on an optical axis X of the lens 101. Further, the spherical part 202a of the front barrier 202 and the spherical part 203a of the rear barrier 203 are formed substantially along the front surface of the lens 101. As shown in FIG. 5, a gear 203b having tooth surfaces on the outer periphery is integrally formed on the pivot shaft 203d of the rear barrier 203.

The rear barrier case 201 holds the barrier lever 205 at the bottom of the rear face of the rear barrier case 201 such that the barrier lever 205 can pivot about the optical axis X of the lens 101 by a predetermined angle. In other words, as shown in FIG. 8, the barrier lever 205 is substantially shaped like an arc having a gear 205a on a part of the front face. In a state in which the gear 205a of the barrier lever 205 is always engaged with the gear 203b of the rear barrier 203, the barrier lever 205 is fit into a recessed arc portion 201b (see FIG. 3) at the bottom of the rear face of the rear barrier case 201 such that the barrier lever 205 can slide in the circumferential direction. Therefore, the rear barrier 203 pivots in response to the pivoting of the barrier lever 205.

As shown in FIGS. 3 and 7, the barrier piece 206 is disposed on the rear face of the barrier lever 205. The barrier lever 205 and the barrier piece 206 sandwich a barrier lever spring 207 such that the barrier lever spring 207 can expand and contract in the longitudinal direction, the barrier lever spring 207 being stored in a curved position. The barrier piece 206 can pivot on the rear face of the barrier lever 205 about the same pivotal axis as the barrier lever 205 by a predetermined angle, within the expansion and contraction range of the barrier lever spring 207. As shown in FIG. 6, a position detection rib 206c is formed on the barrier piece 206. When the barrier piece 206 pivots to a predetermined position, a position sensor 209c (see FIG. 9) provided on the barrier motor unit 209 detects the position detection rib 206c and stops the rotation of the motor 209a of the barrier motor unit 209.

As shown in the exploded views of FIGS. 3 and 7, the front angle 208 is fixed to the rear barrier case 201 by front angle fixing screws 211, so that the barrier lever 205, the barrier piece 206, and the barrier lever spring 207 are combined into a single unit. As shown in FIG. 6, a pair of projecting portions 206f is formed on the barrier piece 206 so as to project to the rear. The projecting portions 206f of the barrier piece 206 are engaged with a driving piece 209f (see FIG. 9) that is laterally driven by the motor 209a of the barrier motor unit 209.

As shown in the exploded views of FIGS. 3 and 7, the front barrier case 204 is disposed in the front of the front barrier 202. The front angle 208 and the front barrier case 204 are fastened by front case fixing screws 212 inserted from the front barrier case 204 to the rear, so that the front barrier 202 and the rear barrier 203 are held without being detached from the pivot shaft hole 201d of the rear barrier case 201. Further, the manual focus ring unit 103 is disposed at the front of the front barrier case 204.

[3. Operations of the Lens Barrier Unit]

Figure 10:
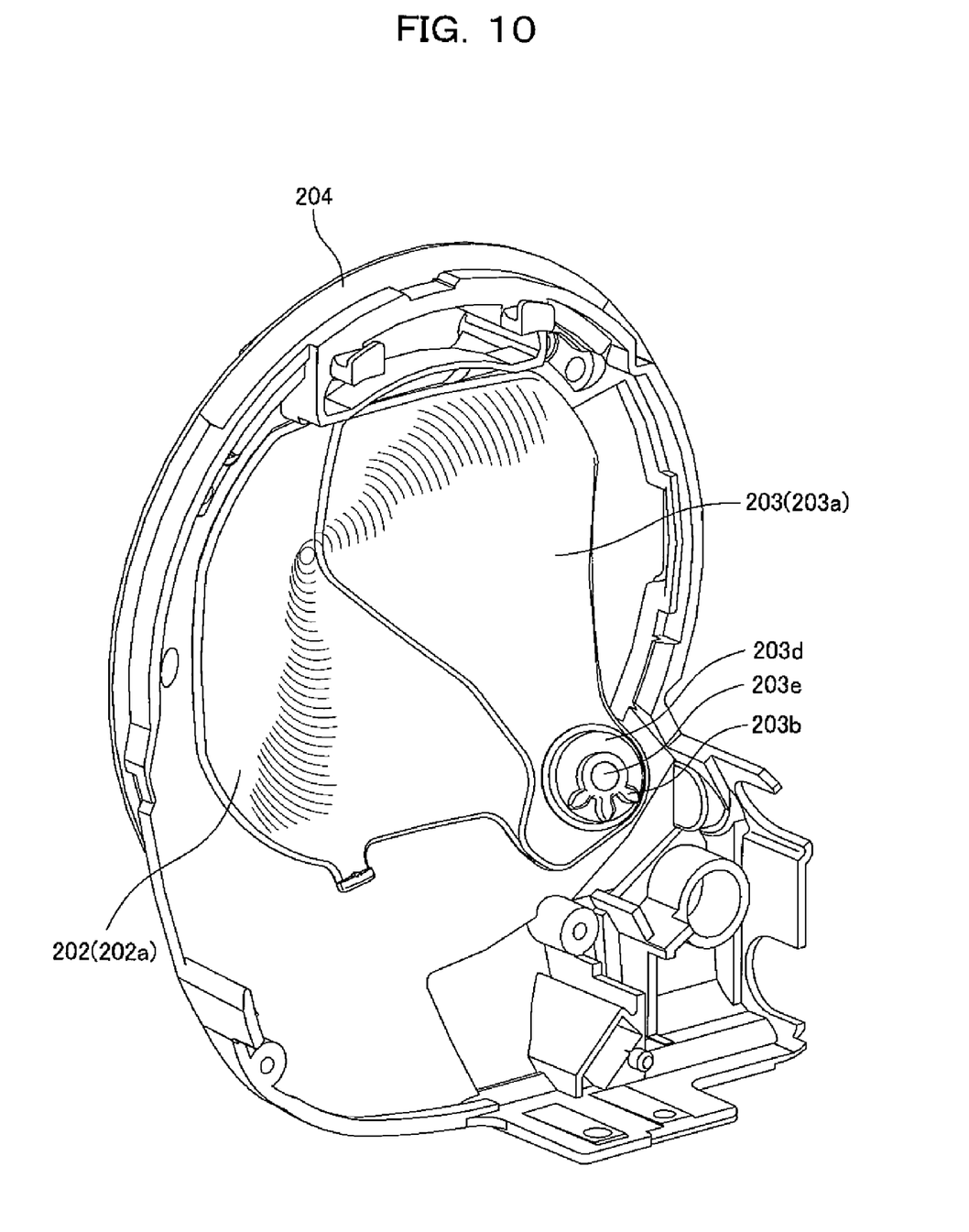
FIG. 10 is a perspective view showing a closed state of the front barrier and the rear barrier of the lens barrier unit.
Figure 11:
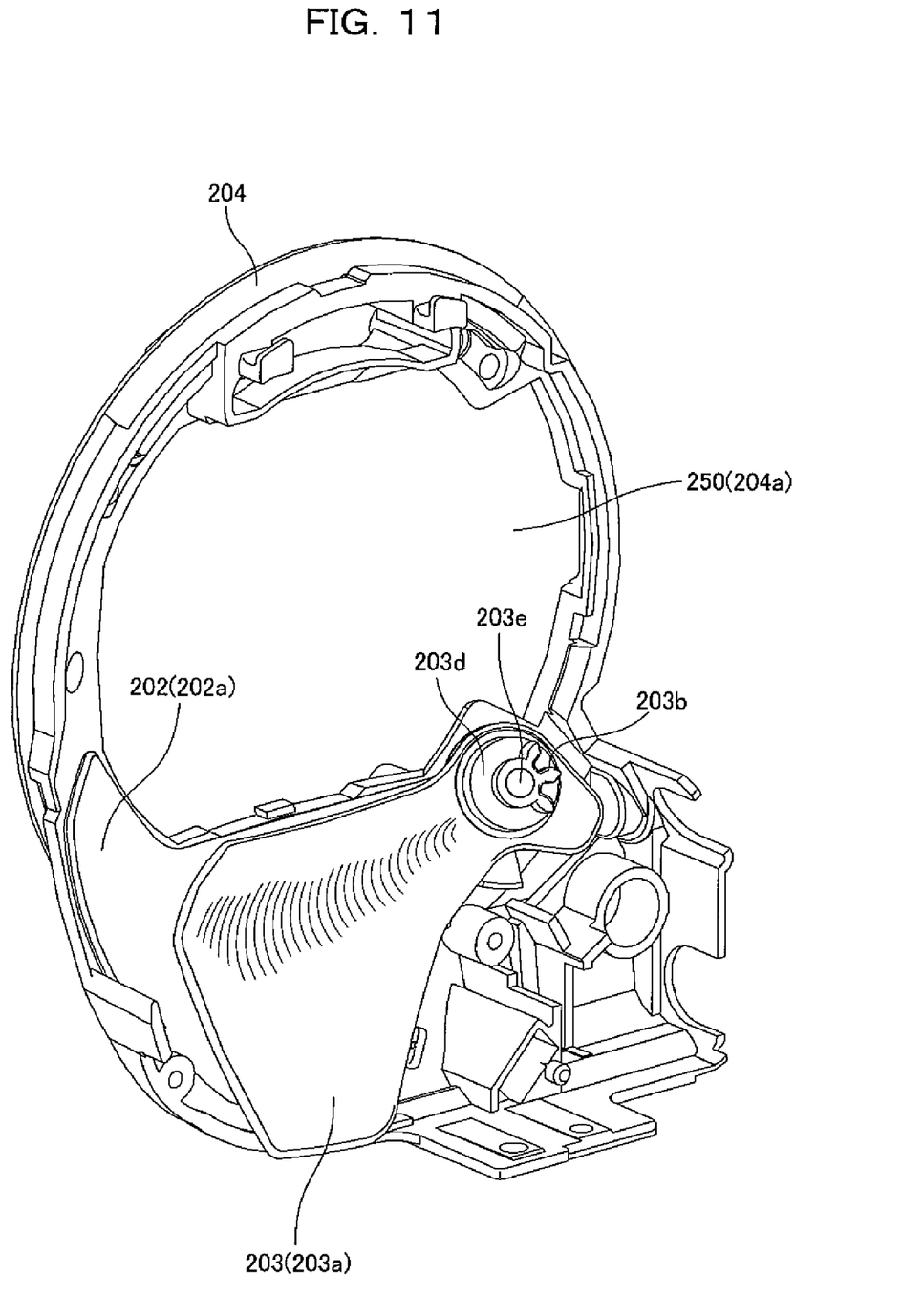
FIG. 11 is a perspective view showing an opened state of the front barrier and the rear barrier of the lens barrier unit.

Referring to FIGS. 10 to 15, the following will describe the opening and closing operations of the front barrier 202 and the rear barrier 203 in the lens barrier unit 200. FIG. 10 is a perspective view showing a closed state of the front barrier and the rear barrier of the lens barrier unit. FIG. 11 is a perspective view showing an opened state of the front barrier and the rear barrier of the lens barrier unit. FIG. 12 is an explanatory drawing of a mechanism in which the rear barrier opens and closes the front barrier, and is also a perspective view in which the front barrier is pivoted by the rear barrier.

When the lens barrier unit 200 is closed (first state), as shown in FIG. 10, the front barrier 202 and the rear barrier 203 are held in a state in which the front barrier 202 substantially closes the left side of the opening 204a and the rear barrier 203 substantially closes the right side of the opening 204a.

In order to open the lens barrier unit 200 (second state), the motor 209a of the barrier motor unit 209 is operated and the driving piece 209f in the barrier motor unit 209 is moved in a predetermined direction (see FIG. 9). Thus the force of the motor 209a (hereinafter, will be called a driving force) is transmitted to the barrier piece 206 via the projecting portion 206f (see FIG. 6) of the barrier piece 206 engaged with the driving piece 209f and the barrier lever 205 pivots in the same direction as the barrier piece 206 via the barrier lever spring 207. This operation transmits the driving force to the rear barrier 203 via the engaged portion of the gear 205a of the barrier lever 205 and the gear 203b of the rear barrier 203, and thus the rear barrier 203 pivots in the opening direction. When the rear barrier 203 pivots by a predetermined angle, the driving convex portion 203f of the rear barrier 203 comes into contact with the driven engaging portion 202b of the front barrier 202, the driving force is also transmitted to the front barrier 202, and the front barrier 202 pivots in the opening direction. When the barrier lever 205 having opened the front barrier 202 and the rear barrier 203 reaches a predetermined pivot angle, the position detection rib 206c of the barrier piece 206 reaches the reading position of the position sensor 209c provided on the barrier motor unit 209. Thus the rotation of the motor 209a of the barrier motor unit 209 is stopped.

In the case where the amount of travel of the driving piece 209f of the barrier motor unit 209 is not completely equal to the amount of travel of the barrier lever 205, the difference is absorbed by the expansion and contraction of the barrier lever spring 207. Therefore, an excessive load is not applied to the barrier motor unit 209.

As shown in FIG. 11, when the front barrier 202 and the rear barrier 203 of the lens barrier unit 200 completely enter an opened state, the front barrier 202 and the rear barrier 203 are both stored under the imaging range of the lens 101 and rearward of the front end of the lens 101, in the lower parts of the front barrier case 204 and the rear barrier case 201. The closing operation of the front barrier 202 and the rear barrier 203 is performed and controlled in the reverse order from the opening operation.

[4. The Storage Position of the Barrier]

Referring to FIGS. 14 and 15, the storage positions (retraction positions) of the front barrier 202 and the rear barrier 203 will be described below. As has been discussed, FIG. 14 is a longitudinal section of the closed lens barrier unit (first state) along the vertical plane passing through the optical axis of the lens of the digital video camera. FIG. 15 is a longitudinal section of the opened lens barrier unit (second state) along the vertical plane passing through the optical axis of the lens of the digital video camera.

As shown in FIG. 15, the front barrier 202 and the rear barrier 203 in an opened state are stored under the imaging range of the lens 101 and rearward of the front end of the lens 101. In other words, in an opened state (the second state for opening the opening 250), the front barrier 202 and the rear barrier 203 are stored in the lower parts of the front barrier case 204 and the rear barrier case 201, which act as the barrier cases, and rearward of the positions of the barrier cases in a closed state (the first state for closing the opening 250). With this configuration, a space is provided above the imaging range of the lens 101 and in front of the outer periphery of the lens 101. The strobe light emitting unit 102 and the manual focus ring unit 103 of the digital video camera 100 are disposed in this space.

In other words, according to the present invention, the front barrier 202 and the rear barrier 203 in an opened state are stored only in the lower parts of the front barrier case 204 and the rear barrier case 201. Thus it is possible to reduce the retraction spaces of the front barrier 202 and the rear barrier 203 as compared with the case where a barrier is dividedly stored upward and downward from the opening of a barrier case. Consequently, without increasing the size of the lens-barrel 111, the strobe light emitting unit 102 can be disposed at the top of the barrier unit 200 in the lens-barrel 111.

Further, the pivot shafts 202e and 203d of the front barrier 202 and the rear barrier 203 have the pivotal axes located on a line from the spherical parts 202a and 203a of the front barrier 202 and the rear barrier 203 to the center 0 of the sphere B. With this configuration, when the front barrier 202 and the rear barrier 203 are opened and closed, the barriers move along spherical surfaces constituting the spherical parts 202a and 203a. Thus it is possible to considerably reduce the areas of the movement paths of the front barrier 202 and the rear barrier 203 and the storage space for retraction. Moreover, the pivot shafts 202e and 203d are directly provided on the spherical parts 202a and 203a of the front barrier 202 and the rear barrier 203 and thus a pivoting arm or the like is not necessary. It is therefore possible to eliminate the need for a space for moving the arm, minimizing a space for the barrier unit 200 and achieving a space-saving design.

In the present embodiment, the front barrier 202 and the rear barrier 203 are stored only in the lower parts of the front barrier case 204 and the rear barrier case 201. The present invention is not limited to this configuration. For example, the front barrier 202 and the rear barrier 203 may be stored only in the upper parts of the front barrier case 204 and the rear barrier case 201. In other words, the front barrier 202 and the rear barrier 203 are both stored so as to be displaced from the openings of the front barrier case 204 and the rear barrier case 201 in one direction, achieving a space-saving design.

In the present embodiment, the pivot shafts 202e and 203d for the pivoting of the front barrier 202 and the rear barrier 203 are formed on the front barrier 202 and the rear barrier 203. The present invention is not limited to this configuration. For example, the pivot shafts for the pivoting of the front barrier 202 and the rear barrier 203 may be provided on the front barrier case 204 and the rear barrier case 201 and holes to be fit to the pivot shafts may be formed on the front barrier 202 and the rear barrier 203. Also in this configuration, the front barrier 202 and the rear barrier 203 pivot along the spherical surfaces constituting the spherical parts.

In the present embodiment, the barrier case is made up of the two components, that is, the front barrier case 204 and the rear barrier case 201. The present invention is not limited to this configuration. For example, the barrier case may be made up of a single component and the front barrier 202 and the rear barrier 203 may be stored in a storage space provided at the front side or the rear side of the barrier case.

In the present embodiment, the barrier is made up of the two barriers (the front barrier 202 and the rear barrier 203). The present invention is not limited to this configuration and the same configuration is applicable to three or more barriers.

What is claimed is:

1. A lens barrier unit comprising:

a barrier case having an opening; and multiple spherical barriers provided so as to pivot about a pivotal axis, wherein the barriers are movable between a first state for closing the opening and a second state for opening the opening, the barriers in the second state are all stored so as to be displaced from the opening of the barrier case in one direction, the barriers in the second state are stored so as to be at least partially located rearward of the barriers in the first state, and the pivotal axis is provided along a line from a surface to a center of a sphere that forms a spherical shape of the barrier.

2. The lens barrier unit according claim 1, wherein the barriers are stored in a lower part of the barrier case in the second state.

3. The lens barrier unit according claim 1, wherein in the first state with the closed opening, the barriers form an exposed portion in the opening such that the exposed portion is centered on an optical axis of a lens to be protected by the barriers, and the barriers are substantially shaped along a front face of the lens.

4. An imaging device comprising:

a lens barrier unit, the lens barrier unit including:

a barrier case having an opening; and multiple spherical barriers provided so as to pivot about a pivotal axis, wherein the barriers are movable between a first state for closing the opening and a second state for opening the opening, the barriers in the second state are all stored so as to be displaced from the opening of the barrier case in one direction, the barriers in the second state are stored so as to be at least partially located rearward of the barriers in the first state, and the pivotal axis is provided along a line from a surface to a center of a sphere that forms a spherical shape of the barrier.

5. The imaging device according claim 4, wherein the barriers are stored in a lower part of the barrier case in the second state.

6. The imaging device according claim 4, wherein in the first state with the closed opening, the barriers form an exposed portion in the opening such that the exposed portion is centered on an optical axis of a lens to be protected by the barriers, and the barriers are substantially shaped along a front face of the lens.

* * * * *

UNITED STATES PATENT AND TRADEMARK OFFICE
CERTIFICATE OF CORRECTION

PATENT NO. : 8,186,894 B2  Page 1 of 1
APPLICATION NO. : 12/939456
DATED : May 29, 2012
INVENTOR(S) : Kuroki It is certified that error appears in the above-identified patent and that said Letters Patent is hereby corrected as shown below:

Column 9, line 24 (Claim 2): after "according" insert --to--.
Column 9, line 27 (Claim 3): after "according" insert --to--.
Column 10, line 20 (Claim 5): after "according" insert --to--.
Column 10, line 23 (Claim 6): after "according" insert --to--.

Signed and Sealed this
Fifteenth Day of January, 2013

David J. Kappos
*Director of the United States Patent and Trademark Office*